(12) United States Patent
Monroe

(10) Patent No.: US 11,654,735 B2
(45) Date of Patent: May 23, 2023

(54) RAILGEAR AND AUTOMATIC MECHANICAL LOCK FOR RAILGEAR

(71) Applicant: Diversified Metal Fabricators, Inc., Atlanta, GA (US)

(72) Inventor: Timothy Alwin Monroe, Atlanta, GA (US)

(73) Assignee: DIVERSIFIED METAL FABRICATORS, INC., Atlanta, GA (US)

( * ) Notice: Subject to any disclaimer, the term of this patent is extended or adjusted under 35 U.S.C. 154(b) by 336 days.

(21) Appl. No.: 17/001,927

(22) Filed: Aug. 25, 2020

(65) Prior Publication Data

US 2021/0061035 A1 Mar. 4, 2021

Related U.S. Application Data

(60) Provisional application No. 62/893,914, filed on Aug. 30, 2019.

(51) Int. Cl.
| | |
|---|---|
| *B60F 1/04* | (2006.01) |
| *B61F 3/12* | (2006.01) |
| *B61C 11/00* | (2006.01) |
| *B61B 15/00* | (2006.01) |

(52) U.S. Cl.
CPC .............. *B60F 1/043* (2013.01); *B61B 15/00* (2013.01); *B61C 11/005* (2013.01); *B61F 3/125* (2013.01)

(58) Field of Classification Search
CPC .... B60F 1/00; B60F 1/04; B60F 1/043; B60F 1/046; B60F 2301/00; B60F 2301/04; B61B 15/00; B61C 11/00; B61C 11/005; B61F 3/12; B61F 3/125; B23B 31/26; B23B 31/263; B61D 3/12; E05B 15/006; E05B 17/2019; E05B 2015/107; E05B 17/2011; E05B 63/121; E05C 19/009; E05C 19/04

See application file for complete search history.

(56) References Cited

U.S. PATENT DOCUMENTS

| | | | | |
|---|---|---|---|---|
| 1,514,845 | A * | 11/1924 | Fischer | E05C 19/04 16/85 |
| 2,439,057 | A * | 4/1948 | Russell | E05C 19/04 292/183 |
| 5,279,194 | A * | 1/1994 | Armbrust | B23B 29/046 82/160 |
| 6,298,792 | B1 * | 10/2001 | Jackson, Jr. | B60F 1/043 105/215.1 |
| 2014/0261067 | A1 * | 9/2014 | Davis | B60F 1/00 105/215.2 |
| 2019/0263205 | A1 * | 8/2019 | Mascola | B60F 1/043 |

* cited by examiner

*Primary Examiner* — Zachary L Kuhfuss
*Assistant Examiner* — Cheng Lin
(74) *Attorney, Agent, or Firm* — Thomas|Horstemeyer, LLP

(57) ABSTRACT

Disclosed are various embodiments for an automatic locking system for railgear. In an embodiment, the automatic locking system for railgear is an automatic mechanical locking system that can be incorporated into a front guide railgear assembly for use with conventional roadway vehicles. The automatic locking system can secure the railgear in a fixed orientation, either deployed for rail travel using the guide wheels of the railgear on rail tracks or stowed for highway travel such that the vehicle can operate using the conventional tires on a road, highway, and the like.

19 Claims, 8 Drawing Sheets

RAILGEAR AND AUTOMATIC MECHANICAL LOCK FOR RAILGEAR

CROSS-REFERENCE TO RELATED APPLICATION

This application claims the benefit of U.S. Provisional Patent Application No. 62/893,914, filed Aug. 30, 2019, which is entirely incorporated herein by reference.

TECHNICAL FIELD

The present disclosure generally relates to railgear, in particular railgear for a road vehicle.

BACKGROUND

A conventional road vehicle, designed to travel on roads or highways, can be adapted with front and rear guide wheel assemblies to convert for use on a railway. Such vehicles, sometimes called road-rail or hi-rail vehicles, are equipped with both conventional tires to operate on roads and railgear with rail guide wheels to operate on railroad tracks. Depending on the mode of use, the railgear can be stowed in a raised position for vehicle use on the roadway or lowered to engage and for use on the railway.

SUMMARY

The present disclosure is directed towards an automatic mechanical lock for railgear and railgear incorporating the automatic mechanical lock. For example, front and rear guide wheel assemblies, also known as railgear assemblies, can be attached to a conventional road vehicle, designed to travel on roads, highways, or other substantially flat surfaces to convert the road vehicle for use on a railway. Such a vehicle may be embodied in the form of, for example but not limited to, a truck, a pickup truck, a car, a van, a bus, a tractor, a trailer, a backhoe, a bulldozer, a crawler, or any other type of machinery to which the railgear may be attached to facilitate the machinery traveling along the railway. An assembly comprised of guide wheels attached to a separate axle than the existing vehicle axle may be referred to as railgear, rail wheels, or hi-rail gear. The railgear can be deployed by lowering or extending downwardly the guide wheels for use on the railway or stowed by raising or retracting the guide wheels so they will not interfere with the operation of the vehicle when using its conventional tires on a roadway. The two positions of the railgear are sometimes referred to as rail mode or highway mode, respectively.

In accordance with a non-limiting example of the present disclosure, the present automatic mechanical lock for railgear can be incorporated into a front guide wheel assembly for use with conventional roadway vehicles, such as large trucks, utility vehicles, and the like. For example, a front guide wheel assembly can be configured to attach to the frame and front axle of the vehicle. When deployed or extended the front guide wheel assembly engages the tracks of the railway and lifts the front wheels of the vehicle off the track, thus, utilizing the vehicle's front suspension for use with the front guide wheel assembly. When used in conjunction with a rear guide wheel assembly, the front railgear supports the vehicle and helps the vehicle navigate railway curves smoothly and dampen out the effects of track irregularities.

Railgear can be configured in a variety of sizes and load capacities depending on the vehicle, equipment, or application. For example, railgear can be designed for a vehicle with a gross vehicle weight rating (GVWR) of 33,000 lbs and above. The structural members and brackets of the guide wheel assembly can be constructed of carbon steel or other suitable material. The guide wheels can be machined from hardened steel castings or forgings and fitted to high strength alloy steel axles with heavy-duty tapered roller bearings.

The railgear can be deployed for use on the railway or retracted and stowed for vehicle use on the roadway. For example, a front guide wheel assembly can comprise at least one pivot arm or link configured to hold the railgear and move or pivot between a stowed (retracted) position and deployed (extended) position. In some examples, the movement between the two positions can be assisted with a hydraulic actuator. As such, it can be advantageous to secure the railgear in a fixed orientation, either deployed for rail travel using the guide wheels on rail tracks or stowed for highway travel such that the vehicle can operate using the conventional tires on a road, highway, and the like.

To secure railgear in a stowed position a pin-off or lock may be used. Conventional railgear utilizes a manual pin-off or lock which has its disadvantages including requiring manual operation. Prior attempts at an automatic mechanical lock have utilized a gated mechanism that has concerns about added costs and complexity and suffers reliability, durability and engagement issues.

The present systems overcome the aforementioned disadvantages. They provide a railgear system and an automatic mechanical locking system for railgear at a lower cost, at less complexity, that is more reliable and that solves engagement issues.

In an embodiment herein, a system is provided in the form of an automatic mechanical lock for railgear. The system can comprise a locking device comprising a body having a first end and an opposed second end (for example, the body can be an elongated body), the body having an inner cross-section tapering to an aperture at the first end, the body having at least a first portion and a second portion, the first portion extending from the first end to a first length having a first outer cross-section forming a shoulder at the second portion, the second portion extending for a second length and having a second outer cross-section, the first cross-section being less than the second outer cross-section; a detent sized to fit within the inner cross-section of the body, the detent having a cross-section larger than the cross-section of the aperture at the first end; a cup sized to fit within the inner cross-section of the body, the cup positioned adjacent a side of the detent opposite the first end of the body, the cup configured to partially seat the detent within the body; and a spring secured and positioned within the body between the cup and the second end of the body, the spring in contact with the cup, the spring configured to push the cup and detent against the aperture of the first end with a portion of the detent protruding outwardly from the first end of the body; and a catch assembly configured to attach to a plate, the plate having a thickness, the catch assembly comprising: a detent catch having a body with a head attached to a base end and a seat at an end opposite the base end, the body having a length equal to or greater than the thickness of the plate, the seat configured to receive a portion of the detent protruding outwardly from the aperture of the first end of the locking device; an anti-rotation plate comprising an aperture, the aperture configured to receive and mate with the head of the detent catch; a pin-off base plate, wherein the catch assembly is configured to be secured to the plate, the plate having a catch hole sized to receive the body of the detent catch from a first side of the plate, the head of the detent catch abutting the first side of the plate (which can be a stationary plate), the anti-rotation plate positioned on the first side of the plate, the pin-off base plate positioned on top of the anti-rotation plate and secured to the plate. In any one or more aspects, the detent can be a ball or a pin.

In another embodiment herein, the system can be in the form of an automatic mechanical lock for railgear comprising a locking device comprising a body (for example an elongated body), having a first end and an opposed second end, the body having an inner diameter tapering to an aperture at the first end and an opening at the second end, the body having at least a first portion and second portion, the first portion extending from the first end to a first length having a first outer diameter forming a shoulder at the second portion, the second portion extending for a second length and having a second outer diameter, the first diameter being less than the second outer diameter; a ball sized to fit within the inner diameter of the body, the ball having a diameter larger than the diameter of the aperture at the first end; a cup positioned adjacent a side of the ball opposite the first end of the body, the cup configured to partially seat the ball within the body; and a spring secured and positioned within the body between the cup and the second end of the body, the spring in contact with the cup, the spring configured to push the cup and ball against the aperture of the first end with a portion of the ball protruding outwardly from the first end of the body; and a catch assembly configured to attach to a stationary plate with a thickness, the catch assembly configured to receive a portion of the ball protruding outwardly from the aperture of the first end of the locking device, the catch assembly comprising: a detent catch having a body with a head attached to a base end and a seat at an opposite end, the body having a length substantially equal to or greater than the thickness of the stationary plate, the seat configured to receive a portion of the ball protruding outwardly from the aperture of the body of the first end of the locking device; an anti-rotation plate comprising an aperture, the aperture configured to receive and to mate with the head of the detent catch; a pin-off base plate, wherein the catch assembly is attached to the stationary plate, the stationary plate having a catch hole sized to receive the cylindrical body of the detent catch from a first side of the stationary plate without protruding through a second side of the stationary plate, the head of the detent catch abutting the first side of the stationary plate, the anti-rotation plate positioned on the first side of the stationary plate, the pin-off base plate positioned on top of the anti-rotation plate and secured to the stationary plate with fasteners.

In any one or more aspects of any one or more embodiments of the system herein, the body of locking device can comprise a third portion forming a second shoulder with the second portion and extending to the second end, the third portion having a third outer cross-section less than the second outer cross-section. The body can have a substantially constant inner diameter. The body can have a cylindrical outer peripheral cross-sectional configuration. The body can be substantially cylindrically shaped in cross-section. The body of locking device can comprise a through-hole in a wall in the second portion of the body, the through-hole adapted to receive a grease fitting. The detent catch can have a cylindrical body. The body of the detent catch can have a length equal to or greater than the thickness of the plate. The detent catch of the catch assembly can comprise a through-hole in the base of the detent catch, the through hole forming a seat, for example a funnel-like seat, configured for receiving the portion of the detent protruding outwardly from the first end of the body. The head of the detent catch can have a cross-sectional shape with at least one flat section. The anti-rotation plate can have an aperture with at least one flat side or section. The head of the detent catch of the catch assembly can have two opposed sides, or can be polygonal, hexagonal or octagonal in shape. The anti-rotation plate can be positioned on the first side of the plate with an interference fit of the head and the aperture of the anti-rotation plate. The anti-rotation plate can have two opposed sides, or can have a polygonal, hexagonal or octagonal shaped opening for receiving and securing the head of the detent catch against rotation. The anti-rotation plate can be positioned on the first side of the plate with an interference fit of the head and the aperture of the anti-rotation plate. The locking device can be configured to be secured to a movable plate which is configured to slide or rotate in a plane parallel to the plate, the movable plate having a pin-off hole sized to receive the first portion of the body of the locking device with the first shoulder abutting a first side of the moveable plate and the portion of the detent or ball extending through a second side of the plate, the moveable plate and the plate positioned such that the portion of the detent or ball can be received in the detent catch. The plate can have a catch hole sized to receive the body of the detent catch from a first side of the plate without protruding through a second side of the plate. The plate can be a stationary plate. The body can include a cap configured to close the second end of the body.

In another embodiment herein, an automatic locking system for railgear is provided that can comprise: a rail guide wheel assembly comprising at least one stationary arm and at least one pivot arm, the stationary arm mounted to a vehicle, the pivot arm attached to a railgear axle with guide wheels, the pivot arm positioned in connection with the stationary arm, the pivot arm connected to the stationary arm, the pivot arm connected and moveable with respect to the stationary arm; a locking device comprising a body (for example an elongated body) having a first end and an opposed second end, the body having an inner cross-section tapering to an aperture at the first end, the body having a first portion and a second portion, the first portion extending from the first end to a first length having a first outer cross-section forming a first shoulder at the second portion, the second portion extending for a second length and having a second outer cross-section, the first cross-section being less than the second outer cross-section; a detent sized to fit within the inner cross-section of the body, the detent having a cross-section larger than the cross-section of the aperture at the first end; a cup sized to fit within the inner cross-section of the body, the cup positioned adjacent a side of the detent opposite the first end of the body, the cup configured to partially seat the detent within the body; and a spring secured and positioned within the body between the cup and the second end of the body, the spring in contact with the cup, the spring configured to push the cup and detent against the aperture of the first end with a portion of the detent protruding outwardly from the first end of the body; and a catch assembly, the catch assembly attached to the stationary arm, the stationary arm having a thickness, the catch assembly comprising: a detent catch having a body with a head attached to a base end and a seat at an end opposite the base end, the seat configured to receive a portion of the detent protruding outwardly from the aperture of the body of the first end of the locking device; an anti-rotation plate comprising an aperture, the aperture configured to receive and to mate with the head of the detent catch; a pin-off base plate, wherein the catch assembly is attached to the stationary arm having a catch hole sized to receive the cylindrical body of the detent catch from a first side, the head of the detent catch abutting the first side, the anti-rotation plate positioned on the first side of the stationary arm, the pin-off base plate positioned on top of the anti-rotation plate and secured to the stationary arm with fasteners.

In another embodiment herein, an automatic locking system for railgear is provided comprising: a rail guide wheel assembly comprising a pair of stationary arms and a pair of pivot arms, the stationary arms spaced apart and mounted to a vehicle, the pivot arms attached to a railgear axle with guide wheels, the pair of pivot arms spaced apart and positioned in connection with the pair of stationary arms, each pivot arm connected via a mounting pin to a corresponding stationary arm, the pair of pivot arms connected and moveable with respect to the pair of stationary arms; a pair of opposed oppositely facing locking devices joined with a connector, each locking device comprising a body (for example an elongated body) having a first end and an opposed second end, the body having an inner diameter tapering to an aperture at the first end and an opening at the second end, the body having a first portion, a second portion, and a third portion, the first portion extending from the first end to a first length having a first outer diameter forming a first shoulder at the second portion, the second portion extending for a second length and having a second outer diameter, the first diameter being less than the second outer diameter, a third portion forming a second shoulder with the second portion and extending to the second end, the third portion having a third outer diameter less than the second outer diameter; a detent sized to fit within the inner diameter of the body, the detent having a diameter larger than the diameter of the diameter of the aperture at the first end; a cup positioned adjacent a side of the detent opposite the first end of the body, the cup configured to partially seat the ball within the body; and a spring positioned within the body between the cup and the second end of the body, the spring in contact with the cup, the spring configured to push the cup and detent against the aperture of the first end with a portion of the detent protruding outwardly from the first end of the body, wherein the pair of locking devices are positioned with the second end of each locking device inserted into the connector, the respective ends abutted, and the first end of each locking device inserted into a pin-off aperture in a respective pivot arm; and a catch assembly configured to receive the portion of the detent protruding outwardly from the aperture of the first end of each respective locking device, the catch assembly attached to each stationary arm, each stationary arm having a thickness, the catch assembly comprising: a detent catch having a body with a head attached to a base end and a seat at an opposite end, the seat configured to receive a portion of the detent protruding outwardly from the aperture of the body of the first end of each locking device; an anti-rotation plate comprising an aperture, the aperture configured to receive and to mate with the head of the detent catch; a pin-off base plate, wherein the catch assembly is attached to each stationary arm, each stationary arm having a catch hole sized to receive the body of the detent catch from a first side, the head of the detent catch abutting the first side, the anti-rotation plate positioned on the first side of the stationary arm, the pin-off base plate positioned on top of the anti-rotation plate and secured to each stationary arm.

In any one or more aspects of any one or more embodiments of the automatic locking system for railgear, the body of locking device can comprise a through-hole in a wall in the second portion of the body, the through-hole adapted to receive a grease fitting. The catch assembly can comprise a through-hole in the base of the detent catch, the through hole forming a funnel-like seat configured for receiving the portion of the detent protruding outwardly from the first end of the body. The body can have a substantially constant inner diameter. The body can have a cylindrical outer peripheral cross-sectional configuration. The body can be substantially cylindrically shaped in cross-section. A cap can be included to close the opening of the second end of at least one locking device. The body of the detent catch can have a length equal to or greater than the thickness of the plate. The detent catch can have a cylindrical body. The detent catch of the catch assembly can comprise a through-hole in the base of the detent catch, the through hole forming a seat, for example a funnel-like seat, configured for receiving the portion of the detent protruding outwardly from the first end of the body. The head of the detent catch can have a cross-sectional shape with at least one flat section. The anti-rotation plate can have an aperture with at least one flat side or section. The head of the detent catch of the catch assembly can have two opposed sides, or can be polygonal, hexagonal or octagonal in shape. The anti-rotation plate can be positioned on the first side of the plate with an interference fit of the head and the aperture of the anti-rotation plate. The anti-rotation plate can have two opposed sides or can have a polygonal, hexagonal or octagonal shaped opening for receiving and securing the head of the detent catch against rotation. The anti-rotation plate can be positioned on the first side of the plate with an interference fit of the head and the aperture of the anti-rotation plate. The plate can have a catch hole sized to receive the body of the detent catch from a first side of the plate without protruding through a second side of the plate. The plate can be a stationary plate. The detent can be a ball or a pin.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
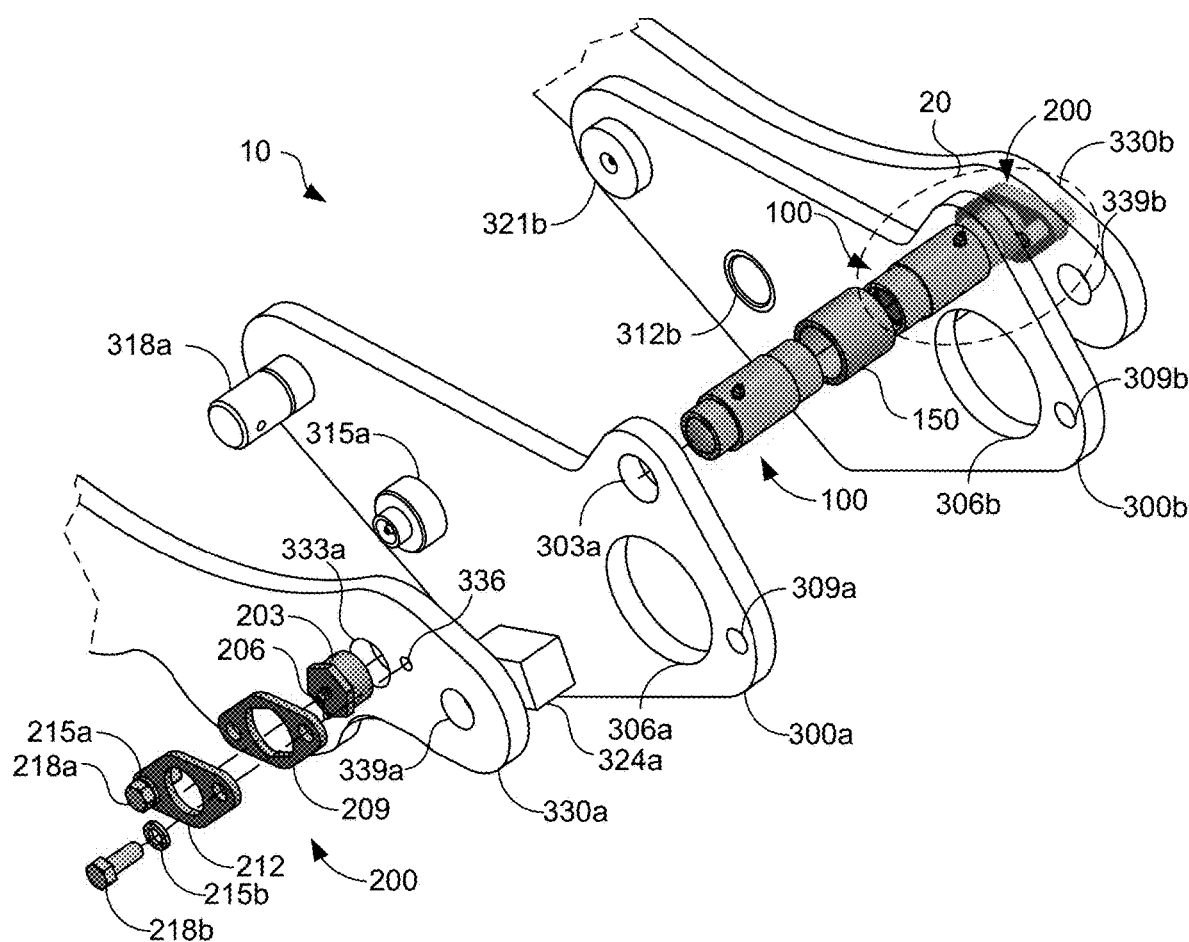
FIG. 1 illustrates an example of an automatic mechanical lock shown in position with respect to stationary and pivot arms of a railgear assembly according to various embodiments of the present disclosure.

Described below are various embodiments of the present systems and methods for railgear and automatic locking mechanisms therefor. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The following examples are put forth to provide those of ordinary skill in the art with a complete disclosure and description of how to construct and use the systems and methods disclosed and claimed herein. Efforts have been made to ensure accuracy with respect to numbers (e.g., amounts, etc.), but some errors and deviations should be accounted for.

It is to be understood that, unless otherwise indicated, the present disclosure is not limited to particular materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

In the following discussion, a general description of the systems of the present disclosure and their components is provided, followed by a discussion of the method of operation of the same. A non-limiting example of an automatic mechanical lock configured to hold a set of railgear in a fixed orientation, either stowed for highway travel or deployed for rail travel and that overcomes such disadvantages is discussed.

With reference to FIG. 1, shown is a partially exploded view of an example of an automatic mechanical lock 10 for railgear according to various embodiments of the present disclosure. The automatic mechanical lock 10 for railgear can be configured to attach to a guide wheel assembly (partially shown) in order to facilitate stowing of railgear in a retracted position when, for example, a hi-rail vehicle (not shown) is used on the road. According to various embodiments, the guide wheel assembly (FIGS. 7A-9B) can be attached or secured to a vehicle such that, for example, the railgear is in front of the front wheels of the vehicle (not shown).

In an embodiment, an automatic lock for railgear is provided. The automatic lock can be an automatic mechanical lock 10 for railgear as depicted in FIG. 1. in the embodiment of FIG. 1, the lock 10 can include a pair of opposed, oppositely directed lock pin-offs 20, also referred to as locking system 20, which is described in greater detail herein. As shown, each lock pin-off 20 can include a lock assembly 100 (FIGS. 2A-2C) and catch assembly 200 (FIGS. 3A-3C), which will be described in greater detail. The automatic mechanical lock 10 is shown relative to pivot arms or links 300a,b and fixed long arms or links 330a,b and portions of a front guide wheel assembly 30 (FIGS. 7A-9B), which for simplicity are also simply referred to herein as pivot arm or link 300 and long arm or link 330.

Each pivot arm 300 can comprise a pinoff aperture 303 to receive a portion or an end of a lock assembly 100 and an axle hole 306 to receive an axle of the railgear (not shown). As shown, a pivot arm 300 can also comprise a tie connector hole 309, cylinder attachment seat 312, cylinder attachment cap 315, pivot pin 318, including pivot pin head 321, and a stop block 324. Each long arm 330 of a front guide wheel assembly 30 can comprise a catch hole 333 to receive a detent catch 203 of the catch assembly 200, plate attachment holes 336 to receive fasteners 218 to attach the catch assembly 200, and a pivot pin hole 342 to receive pivot pin 318 about which the pivot arm 300 can pivot or partially rotate. In this embodiment, a pair of pin-offs 20 are positioned facing opposite directions with a slip joint connector 150 to form the automatic mechanical lock 10.

Figure 2A:
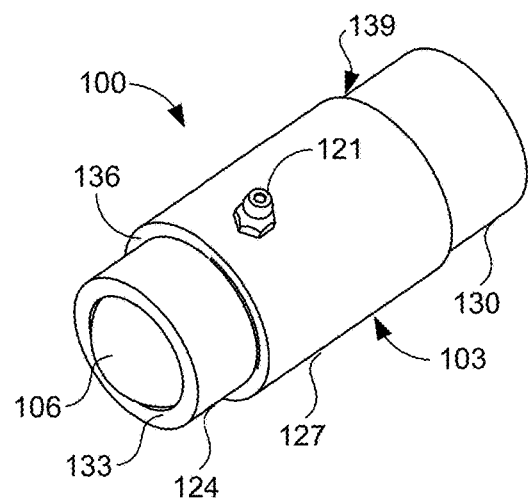
FIG. 2A illustrates an example of a ball lock assembly of a locking system according to various embodiments of the present disclosure.
Figure 2B:
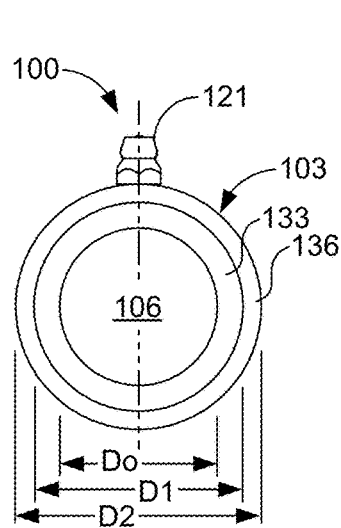
FIGS. 2B-2C are front and cross-sectional views of the ball lock assembly of FIG. 2A according to various embodiments of the present disclosure.
Figure 2C:
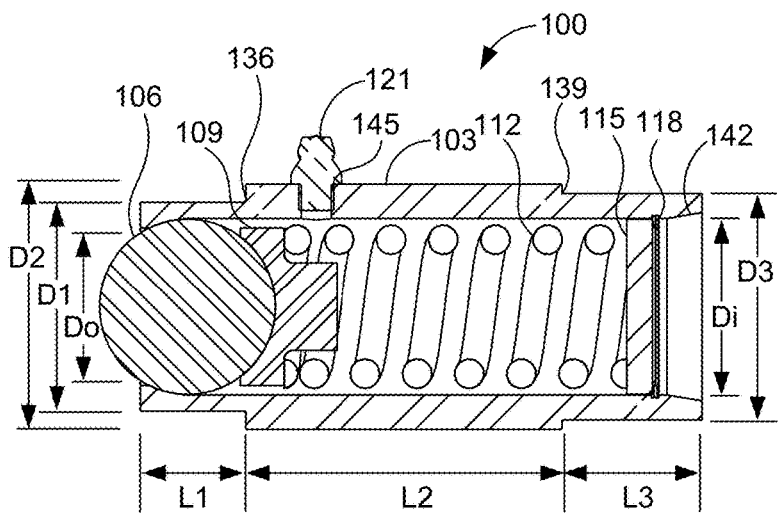

With reference to FIGS. 2A-2C, shown are perspective (FIG. 2A), side (FIG. 2B), and cross-sectional (FIG. 2C) views of a lock assembly 100 of a pin-off 20. As shown in this example, the lock assembly 100 can include a seat tube 103 and a detent 106, such as a ball (as depicted) or a pin. The seat tube 103 can be hollow configured to contain the detent 106, a cup 109, and a spring 112. The seat tube 103 can be formed with a rim 133 on one end and a tapered bore or opening 142 within the opposite end. The rim 133 can have an aperture diameter (Do) smaller than the inner diameter (Di) of the tube 103 and smaller than the diameter of the detent 106. The inner diameter (Di) can be substantially the same cross-sectional diameter as the detent 106 with a clearance for movement of the detent 106 within the tube 103. The lock assembly 100 can be configured with the detent 106 inserted such that a portion or an end of the detent 106 extends or protrudes outwardly through the aperture of the rim 133, while the body of the detent 106 is retained within the one end of the tube 103 by the smaller diameter of the rim 133 of the tube 103. The detent can be contained internally within the opposed end of the tube 103 by the cup 109 and spring 112. For example, a portion or an end of the detent 106 can be received within a hollow or recess in cup 109. The lock assembly 100 can also include a cap 115 and a retaining ring 118 to close the opening 142 on the opposite end. A spring 112 can be positioned within the seat tube 103 between the cup 109 and the cap 115. The spring 112 can be biased to maintain in contact with the cup 109. The spring 112 can be configured to push or bias the cup 109 and detent 106 against the reduced aperture of the rim 133 causing a portion or an end of the detent 106 to protrude outwardly from the rim 133 of the one end of the tube 103. The spring 112 can be configured to apply a force to the detent 106 via the cup 109. If an outside force is applied to the detent 106, the detent 106 can be moved longitudinally within the inner wall in an inward direction away from the opening formed by rim 133 and compress the spring 112. The lock assembly 100 can also include a wall aperture 145 adapted to receive a grease fitting 121.

The seat tube 103 can have a first portion 124 with a first outer diameter (D1) and a second portion 127 with a second outer diameter (D2). The first and second portions forming a first shoulder 136 with the first outer diameter (D1) being smaller than the second outer diameter (D2) and the inner diameter remaining substantially uniform. The first portion 124 can be received in an aperture of a plate, for example, the pin-off aperture 303 of a pivot arm 300. As such, the length (L1) of the first portion 124 may be configured to correspond to the depth of the pin-off aperture 303, which can correspond to a thickness of the pivot arm 300, such that when inserted, the rim 133 of the lock assembly 100 is substantially flush with a surface of the pivot arm 300.

The seat tube 103 can have a third portion 130 with a third outer diameter (D3) smaller than a second outer diameter (D2), forming a second shoulder 139. In an embodiment, the third outer diameter (D3) can be greater than the first outer diameter (D1). In an embodiment, the third outer diameter (D3) can be less than the first outer diameter (D1). In an embodiment, the third outer diameter (D3) can be sized to have an interference fit with the inner surface of a connector 150 (FIG. 1).

Figure 3A:
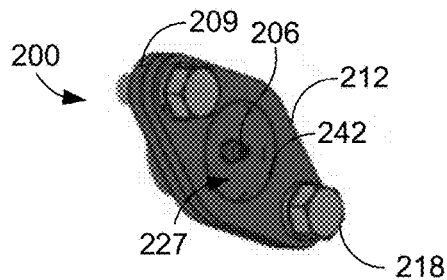
FIGS. 3A-3B illustrate exemplary views of a catch assembly of a locking system according to various embodiments of the present disclosure.
Figure 3B:
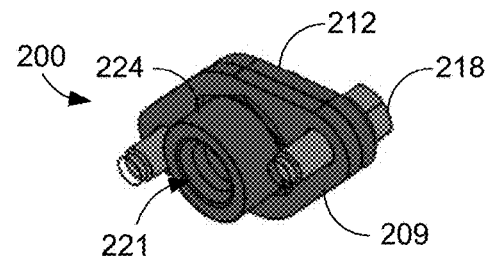
Figure 3C:
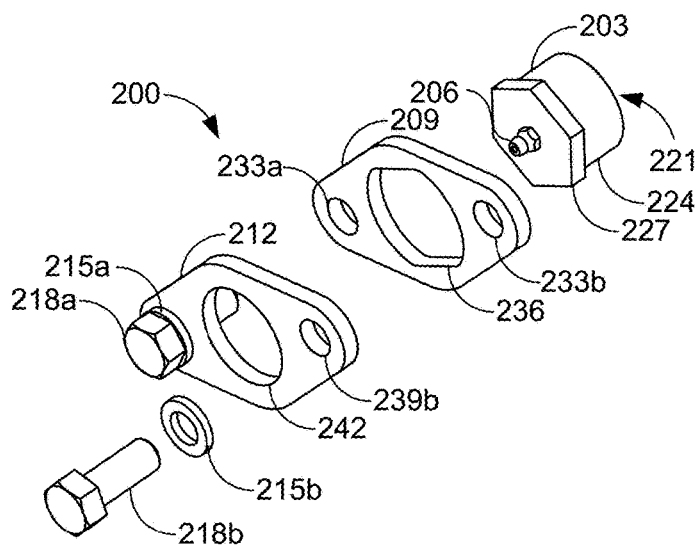
FIG. 3C provides a more detailed exploded view of the catch assembly of a locking system of FIGS. 3A-3B.

With reference to FIGS. 3A-3C, shown are perspective views (FIGS. 2A-2B), and a partially exploded view (FIG. 2C) of a catch assembly 200 for receiving a portion or an end of a detent 106 of the pin-off 20. The catch assembly 200 can include a detent catch 203, an anti-rotation plate 209, a pin-off base plate 212, and one or more fasteners 218. In some embodiments, a grease fitting 206 can also be included. The catch assembly 200 is configured receive a portion or an end of the detent 106 protruding outwardly from the aperture formed in the rim 133 of the lock assembly 100. The catch assembly 200 can be configured to attach or be secured to a stationary plate with a thickness, for example, the long arm 330 of a front guide wheel assembly 30 (FIGS. 7A-9B). The catch assembly 200 can include a detent catch 203 having a body 224, for example a cylindrical body, with a head 227 attached to a base end and a seat 221 at an opposite end. The body 224 can have a length substantially equal to the thickness of the plate or link 330. In any one or more aspects, the head 227 can have a polygonal shape with at least two parallel sides, for example, a square, hexagonal or an octagonal shape. In other aspects, the head 227 can have a double-D head (having two parallel flats machined on a round shaft). The seat 221 of the detent catch 203 can be configured to receive the portion or an end of the detent 106 protruding from the aperture of the seat tube 103 of the lock pin-off assembly 100. In some embodiments, a through-hole in the base of the detent catch 203 forms a seat 221, for example a funnel-like seat, for receiving an outer portion of the detent 106 and adapted to receive a grease fitting 206 through the head 227. In some embodiments, the inner edge of the distal surface of the body 224 in which the seat 221 is formed can be beveled to assist mating of the outer portion of the detent 106 within the seat 221.

The anti-rotation plate 209 can include an aperture 236 with two parallel sides that can be sized to receive the head 227 of the detent catch 203. The pin-off base plate 212 can include an access hole 242. Both the anti-rotation plate 209 and pin-off base plate 212 can have holes 233, 239 for fasteners 218 to secure the catch assembly 200 to the stationary plate, for example long arm 330 of a front guide wheel assembly 30. The pin-off base plate 212 can aid in securing the head 227 of detent catch 203 in place within the aperture 236 of the anti-rotation plate 209 to prevent unwanted rotation of the detent catch 203 within the long arm 330. The grease fitting 206 of the detent catch 203 may be accessed via the hole 242 of the pin-off base plate 212 and the aperture 236 of the anti-rotation plate 209.

To address any wear issues of the seat 221 of the detent catch 203, for example asymmetrical wear of the seat 221, the pin-off base plate 212 can be removed and the detent catch 203 rotated for continued use. For example, if the head 227 of the detent catch 203 can be hexagonal in shape, the catch may be rotated to another position, and re-fit into the aperture 236 with two parallel sides of the anti-rotation plate 209 mating with two new opposed sides of the head 227, with the pin-off base plate 212 replaced and both plates secured back in place with the fasteners 218.

Figure 4A:
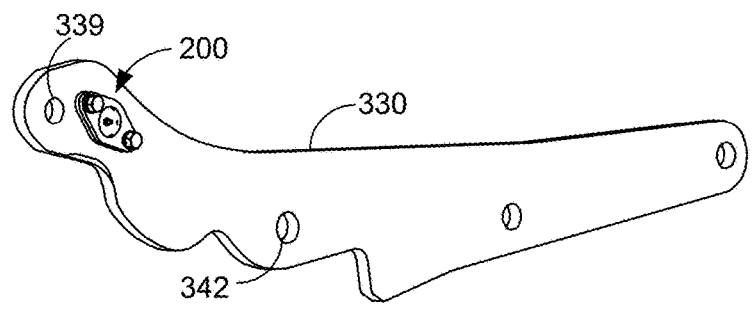
FIGS. 4A-4B illustrate exemplary opposite side perspective views of a catch assembly attached to a long arm of a railgear assembly according to various embodiments of the present disclosure.
Figure 4B:
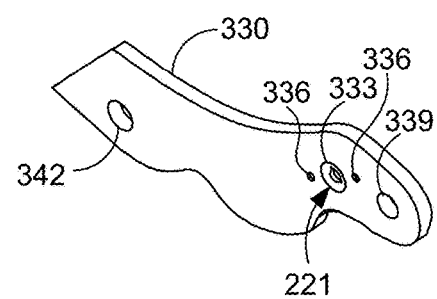

Shown in FIGS. 4A-4B, the catch assembly can be attached or secured to a stationary long arm 330 of a railgear assembly. The long arm 330 can have a catch hole 333 sized to receive the cylindrical body 224 of the detent catch 203 from a first side without the catch body 224 protruding through an opposed (second) side such that the movable plate or pivot arm 300 can move freely and lock when the detent 106 of the lock assembly 100 can be received within the seat 221, the head 227 of the detent catch 203 abutting the first side. The anti-rotation plate 209 can be positioned on the first side of the stationary long arm with an interference fit of the head 227 and the aperture of the anti-rotation plate 209. The pin-off base plate 212 can be positioned on top of the anti-rotation plate 209 and secured to the stationary long arm 330 with fasteners 218.

Figure 5A:
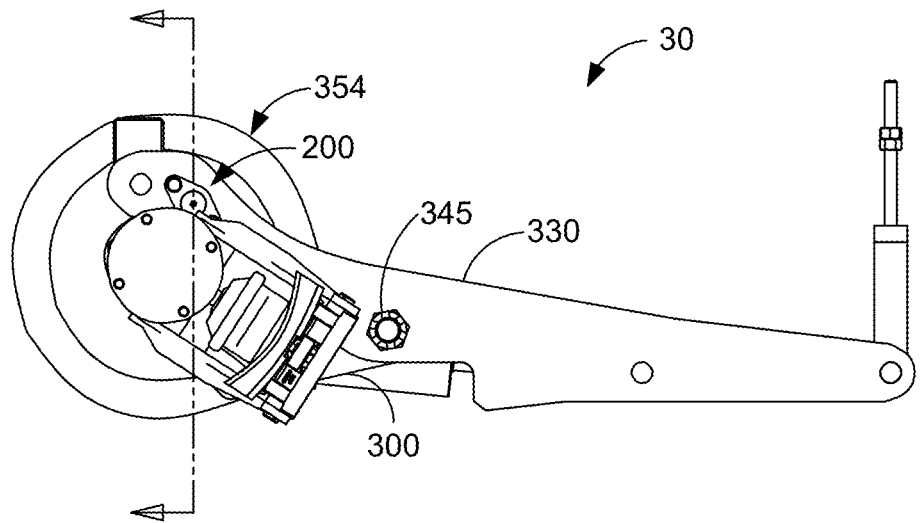
FIGS. 5A-5B are a side and cross-sectional views of a front railgear assembly with an automatic mechanical lock of FIG. 1 according to various embodiments of the present disclosure.
Figure 5B:
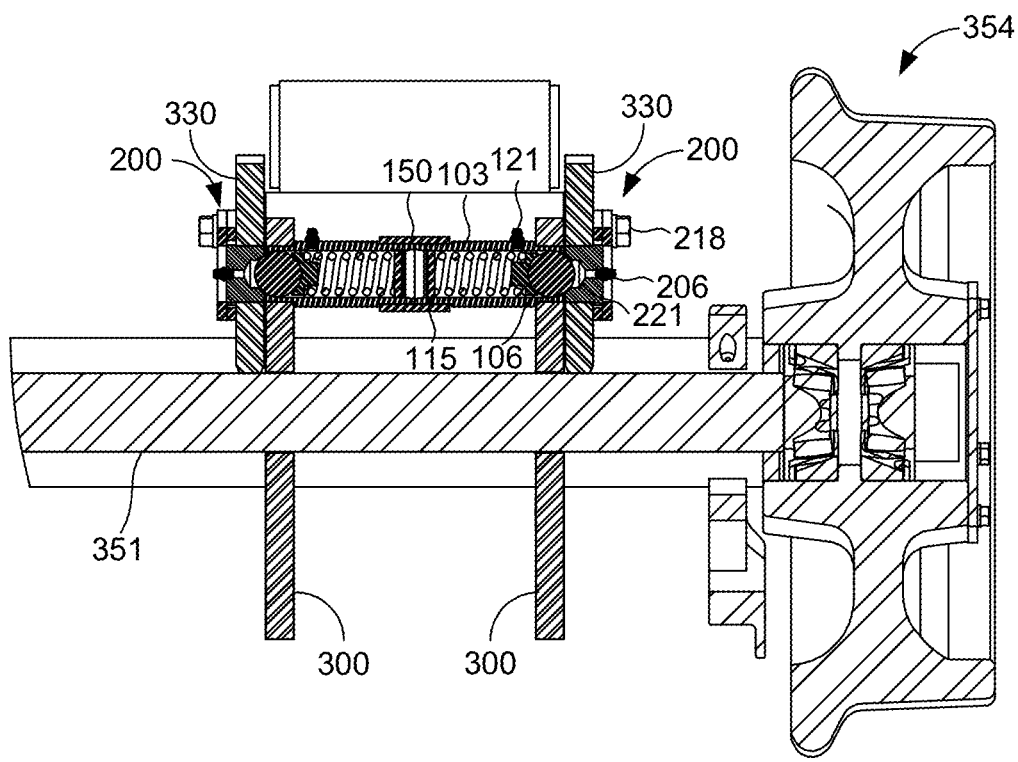

Shown in FIG. 5A is a side view of an exemplary front guide wheel assembly 30 in a stowed (retracted) position. The pivot pin 318 connecting the pivot arm 300 and long arm 330 can be secured by a mounting nut 345, labeled for reference. The section view in FIG. 5B shows a portion of the front guide wheel assembly 30 with the automatic mechanical lock 10 for railgear. The section view illustrates the position of the components of each lock assembly 100 and catch assembly 200 relative to a part of pivot arms 300 and long arms 330 on one side of the front guide wheel assembly 30. The components can be repeated on an opposite side or end of the front guide wheel assembly 30, as shown for example in FIGS. 7A and 7B, FIGS. 8A and 8B, and FIGS. 9A and B.

Figure 6:
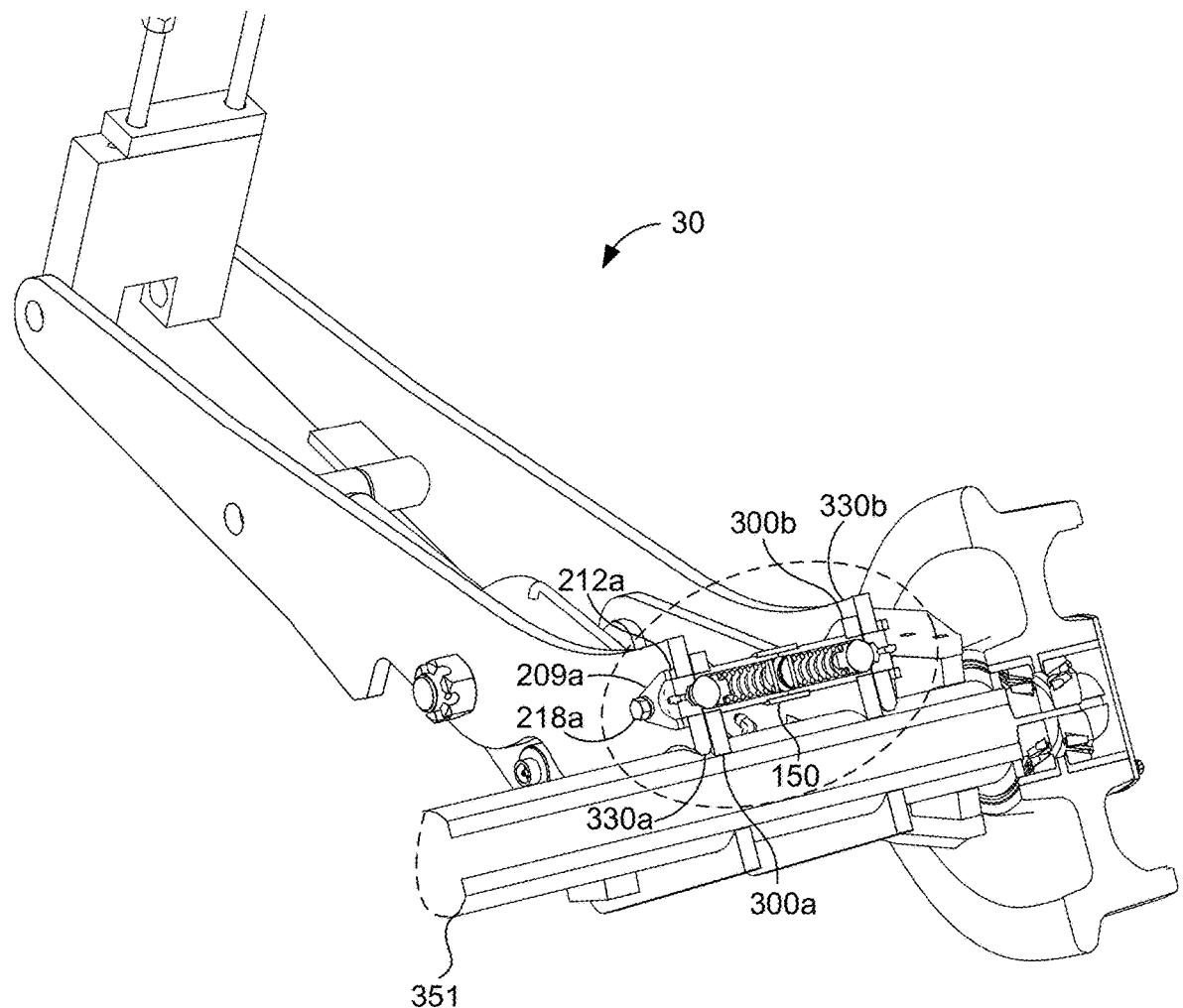
FIG. 6 is a perspective view of a portion a front railgear assembly, cut away to illustrate an automatic mechanical lock of FIG. 1 according to various embodiments of the present disclosure.
Figure 7A:
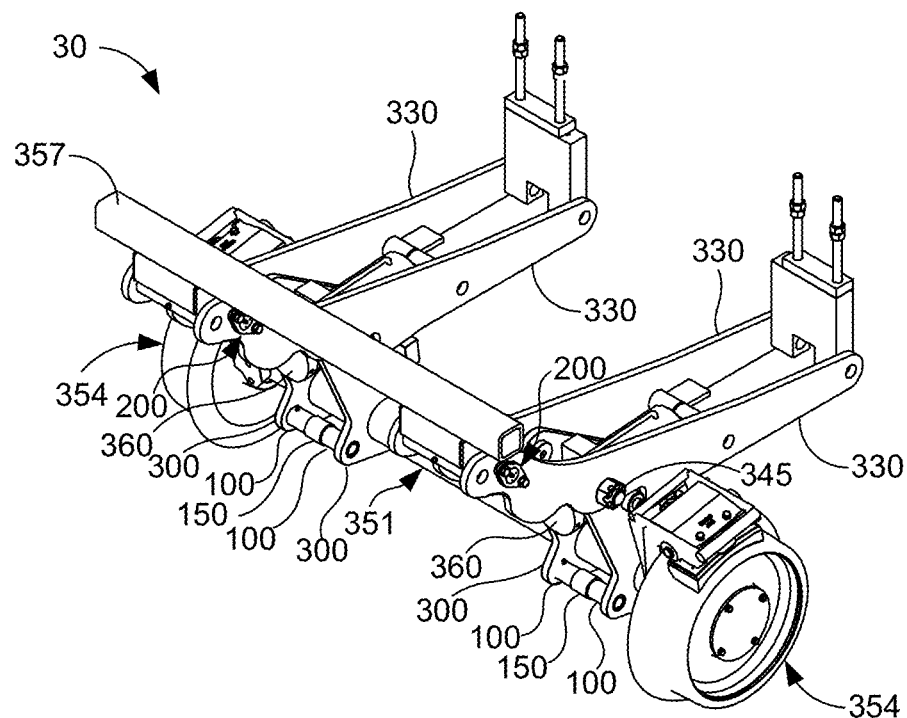
FIGS. 7A-7B are perspective views of the automatic mechanical lock FIG. 1 shown in an example of a front railgear assembly in deployed (FIG. 7A) and stowed (FIG. 7B) positions according to various embodiments of the present disclosure.
Figure 7B:
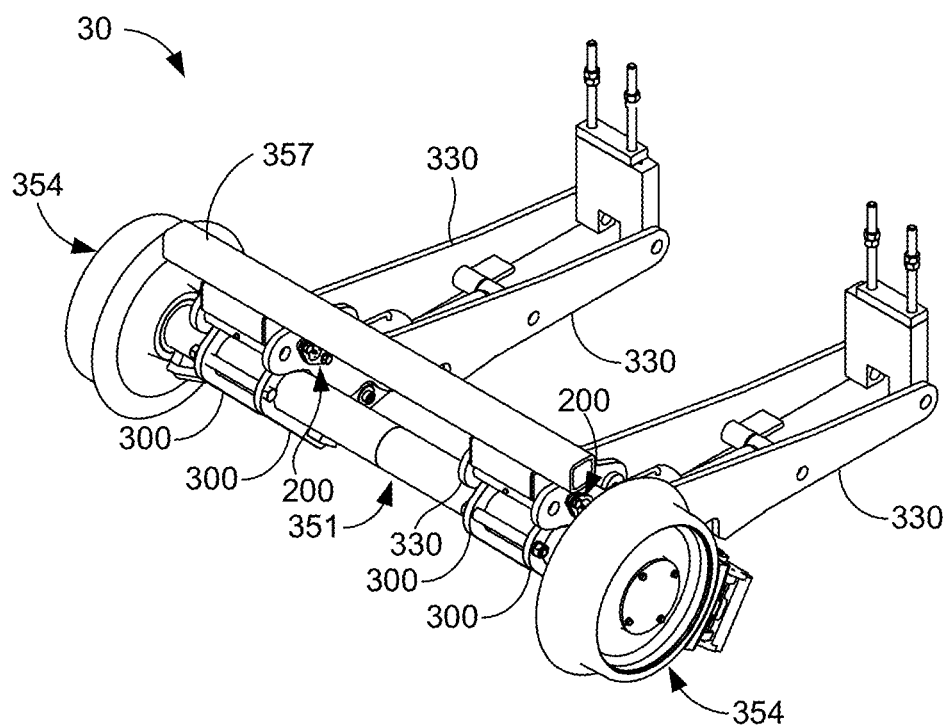

With reference to FIG. 6, shown is a perspective view of a portion of a front guide wheel assembly 30 in a stowed (retracted) position with a portion cut-away to show the position of the automatic mechanical lock 10 according to various embodiments. Shown is the automatic mechanical lock 10 positioned between a pair of pivot arms or links 300 and long arms or links 330 on one side of the front guide wheel assembly 30.

Shown in FIGS. 7A-9B are various views of the automatic mechanical lock of FIG. 1 shown in an exemplary front guide wheel assembly 30 in deployed (extended) and stowed (retracted) positions according to various embodiments of the present disclosure. The relative position of the automatic mechanical lock or components are indicated with respect to the railgear assembly. As shown, the front guide wheel assembly 30 can comprise railgear including axle 351 and a pair of rail guide wheels 354. The front guide wheel assembly 30 can be configured to be attached to a vehicle in part with a bridge tube 357 and/or other structural members. As shown in this example, the axle 351 of the railgear can be supported by two pairs of pivot arms 300 via axle holes 306. Each pair of pivot arms 300 can be positioned between a pair of long arms 330, connected via pivot pins 318 with a pivot pin head 321 securing an end on a side of the pivot arm 300 and a mounting nut 345 securing an end on a side of the long arm 330. (See also, FIG. 1).

A pair of lock assemblies 100 connected with a connector 150 can be positioned between a pair of pivot arms 300 for the automatic mechanical lock 10 for railgear. A pair of catch assemblies 200 can be installed on each long arm 330 such that the seat 221 of the detent catch 203 is flush with the surface of the long arm 330 on the side that is facing a pivot arm 300, such that movement of the pivot arm 300 to the stowed position will engage the automatic mechanical lock 10 as both detents 106 of the lock assembly 100 meet and engage their respective seats 221. Movement of the pivot arms 300 can be actuated with one or more hydraulic cylinders 360.

Figure 8A:
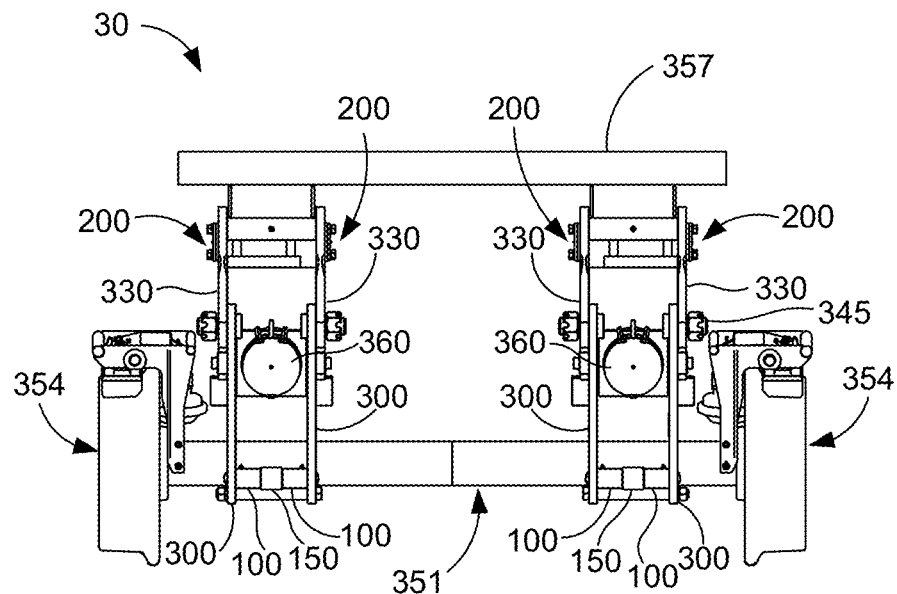
FIGS. 8A-8B are front views of the automatic mechanical lock of FIG. 1 incorporated into an exemplary front railgear assembly in deployed (FIG. 8A) and stowed (FIG. 8B) positions according to various embodiments of the present disclosure.
Figure 8B:
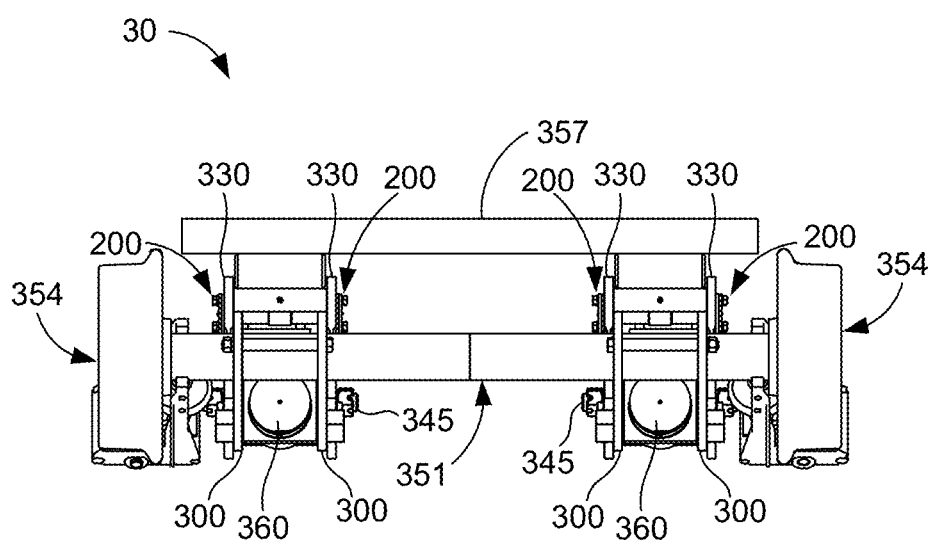
Figure 9A:
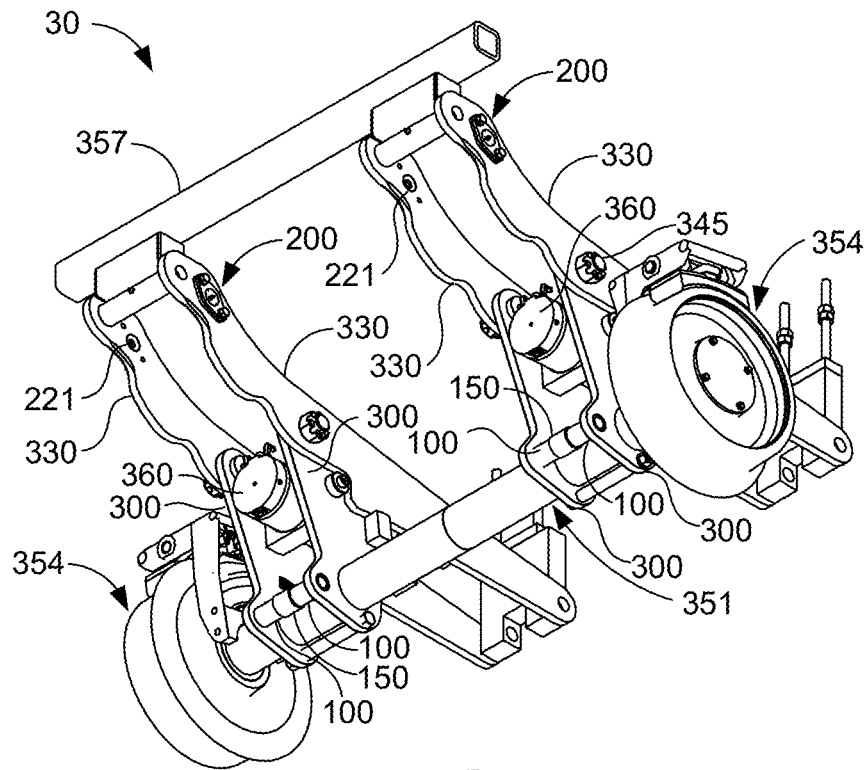
FIGS. 9A-9B are bottom perspective views of the automatic mechanical lock of FIG. 1 incorporated into an exemplary front railgear assembly in deployed (FIG. 9A) and stowed (FIG. 9B) positions according to various embodiments of the present disclosure.
Figure 9B:
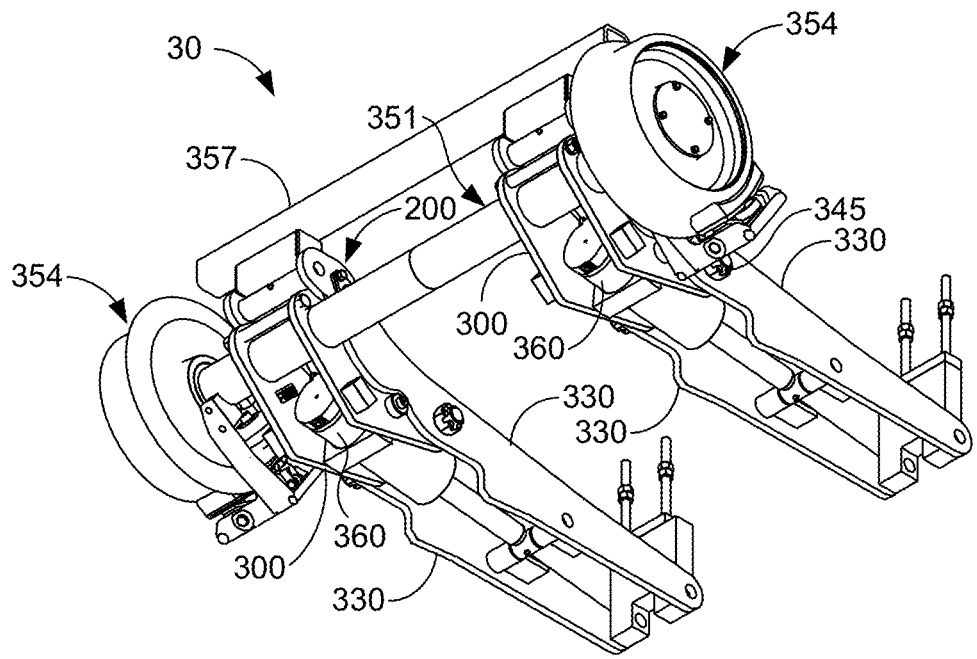

For example, shown in FIG. 8A is an exemplary front view of a front guide wheel assembly 30 in a deployed (extended) position. The automatic mechanical lock 10 is not engaged. The configuration of the front guide wheel assembly 30 can be substantially symmetrical with a left and a right side, with a pair of pivot arms 300 and pair of long arms 330 straddling a hydraulic cylinder 360. As shown, from the left side, a first catch assembly 200 can be attached to the left wheel side of the long arm 330. A first pivot arm 300 can be mounted to the first long arm 330 via a pivot pin 318 and secured by a castle nut 345 applied to the left wheel side of the long arm 330. A first lock assembly 100 can be inserted into the pin-off aperture of the guide wheel assembly 30 such that a portion of the detent 106 protrudes on the left wheel side of the guide wheel assembly 30. A connector 150 can secure an end of the first lock assembly 100 to an end of a second lock assembly 100 which can be similarly installed facing the opposite direction in a second pivot arm 300 mounted to a second long arm 330 with a second catch assembly 200. (See also, FIG. 1). The pivot arms 300 can straddle the hydraulic cylinder 360 and can be configured to move unobstructed to meet the long arms 330. As shown in FIG. 8B, when in a stowed (retracted) position, the pivot arms 300 are locked to the long arms 330 via the automatic mechanical lock 10. Alternate views of deployed and stowed positions of are shown in FIGS. 7A-7B and 9A-9B.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, at least the following is claimed:

1. A system, comprising:
    a locking device comprising
        a body, having a first end and an opposed second end, the body having an inner cross-section tapering to an aperture at the first end, the body having at least a first portion and a second portion, the first portion extending from the first end to a first length having a first outer cross-section forming a shoulder at the second portion, the second portion extending for a second length and having a second outer cross-section, the first outer cross-section having a diameter less than a diameter of the second outer cross-section;
        a detent sized to fit within the inner cross-section of the body, the detent having a cross-section larger than the cross-section of the aperture at the first end;
        a cup sized to fit within the inner cross-section of the body, the cup positioned adjacent a side of the detent opposite the first end of the body, the cup configured to partially seat the detent within the body; and
        a spring secured and positioned within the body between the cup and the second end of the body, the spring in contact with the cup, the spring configured to push the cup and detent against the aperture of the first end with a portion of the detent protruding outwardly from the first end of the body; and a catch assembly configured to attach to a plate, the plate having a thickness, the catch assembly comprising:
  a detent catch having a body with a head attached to a base end and a seat at an end opposite the base end, the seat configured to receive a portion of the detent protruding outwardly from the aperture of the first end of the locking device;
  an anti-rotation plate comprising an aperture, the aperture configured to receive and mate with the head of the detent catch;
  a pin-off base plate,
  wherein the catch assembly is configured to be secured to the plate, the plate having a catch hole sized to receive the body of the detent catch from a first side of the plate, the head of the detent catch abutting the first side of the plate, the anti-rotation plate positioned on the first side of the plate, the pin-off base plate positioned on top of the anti-rotation plate and secured to the plate.

2. The system of claim 1, wherein the body of locking device further comprises a third portion forming a second shoulder with the second portion and extending to the second end, the third portion having a third outer cross-section less than the second outer cross-section.

3. The system of claim 1, wherein the body of locking device further comprises a through-hole in a wall in the second portion of the body, the through-hole adapted to receive a grease fitting.

4. The system of claim 1, wherein the detent catch of the catch assembly further comprises a through-hole in the base of the detent catch, the through hole forming a funnel-like seat configured for receiving the portion of the detent protruding outwardly from the first end of the body.

5. The system of claim 1, wherein the body of the locking device has a substantially constant inner diameter.

6. The system of claim 1, wherein the body of the locking device has a cylindrical outer peripheral cross-sectional configuration.

7. The system of claim 1, wherein the head of the detent catch of the catch assembly has a cross-section with at least one flat section or is polygonal in shape.

8. The system of claim 1, wherein the head of the detent catch of the catch assembly is hexagonal or octagonal in shape.

9. The system of claim 8, wherein the anti-rotation plate has a polygonal shaped opening for receiving and securing the head of the detent catch against rotation.

10. The system of claim 1, wherein the locking device is configured to be secured to a movable plate which is configured to slide or rotate in a plane parallel to the plate, the movable plate having a pin-off hole sized to receive the first portion of the body of the locking device with the first shoulder abutting a first side of the moveable plate and the portion of the detent extending through a second side of the plate, the moveable plate and the plate positioned such that the portion of the detent is received in the detent catch.

11. The system of claim 10, wherein the plate is a stationary plate.

12. An automatic locking system for railgear, the system comprising:
  a rail guide wheel assembly comprising at least one stationary arm and at least one pivot arm, the stationary arm mounted to a vehicle, the pivot arm attached to a railgear axle with guide wheels, the pivot arm positioned in connection with the stationary arm, the pivot arm connected to the stationary arm, the pivot arm connected and moveable with respect to the stationary arm;
  a locking device comprising
    a body having a first end and an opposed second end, the body having an inner cross-section tapering to an aperture at the first end, the body having a first portion and a second portion, the first portion extending from the first end to a first length having a first outer cross-section forming a first shoulder at the second portion, the second portion extending for a second length and having a second outer cross-section, the first outer cross-section having a diameter less than a diameter of the second outer cross-section;
    a detent sized to fit within the inner cross-section of the body, the detent having a cross-section larger than the cross-section of the aperture at the first end;
    a cup sized to fit within the inner cross-section of the body, the cup positioned adjacent a side of the detent opposite the first end of the body, the cup configured to partially seat the detent within the body; and
    a spring secured and positioned within the body between the cup and the second end of the body, the spring in contact with the cup, the spring configured to push the cup and detent against the aperture of the first end with a portion of the detent protruding outwardly from the first end of the body; and
  a catch assembly, the catch assembly attached to the stationary arm, the stationary arm having a thickness, the catch assembly comprising:
    a detent catch having a body with a head attached to a base end and a seat at an end opposite the base end, the seat configured to receive a portion of the detent protruding outwardly from the aperture of the body of the first end of the locking device;
    an anti-rotation plate comprising an aperture, the aperture configured to receive and to mate with the head of the detent catch;
    a pin-off base plate,
    wherein the catch assembly is attached to the stationary arm having a catch hole sized to receive the cylindrical body of the detent catch from a first side, the head of the detent catch abutting the first side, the anti-rotation plate positioned on the first side of the stationary arm, the pin-off base plate positioned on top of the anti-rotation plate and secured to the stationary arm with fasteners.

13. The system of claim 12, wherein the body of locking device further comprises a through-hole in a wall in the second portion of the body, the through-hole adapted to receive a grease fitting.

14. The system of claim 12, wherein the detent catch of the catch assembly further comprises a through-hole in the base of the detent catch, the through hole forming a funnel-like seat configured for receiving the portion of the detent protruding outwardly from the first end of the body.

15. The system of claim 12, wherein the body of the locking device has a substantially constant inner diameter.

16. The system of claim 12, wherein the body of the locking device has a cylindrical outer peripheral cross-sectional configuration.

17. The system of claim 12, wherein the head of the detent catch of the catch assembly has a cross-section with at least one flat section or is polygonal in shape.

18. The system of claim 17, wherein the anti-rotation plate has a polygonal shaped opening for receiving and securing the head of the detent catch against rotation.

19. The system of claim 12, wherein the head of the detent catch of the catch assembly is hexagonal or octagonal in shape.

\* \* \* \* \*